US011823372B2

United States Patent
Young et al.

(10) Patent No.: US 11,823,372 B2
(45) Date of Patent: Nov. 21, 2023

(54) DELIVERY PACKAGE DAMAGE DETECTION USING PHOTOGRAMMETRY MODELS

(71) Applicant: International Business Machines Corporation, Armonk, NY (US)

(72) Inventors: Andrea Young, Austin, TX (US); John Kaufmann, Austin, TX (US); Borja Canseco, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 290 days.

(21) Appl. No.: 16/846,376

(22) Filed: Apr. 12, 2020

(65) Prior Publication Data

US 2021/0319543 A1    Oct. 14, 2021

(51) Int. Cl.
*G06T 7/00* (2017.01)
*G06Q 50/28* (2012.01)
*G01C 11/08* (2006.01)

(52) U.S. Cl.
CPC ............. *G06T 7/001* (2013.01); *G01C 11/08* (2013.01); *G06Q 50/28* (2013.01); *G06T 2207/10004* (2013.01); *G06T 2207/30108* (2013.01)

(58) Field of Classification Search
None
See application file for complete search history.

(56) References Cited

U.S. PATENT DOCUMENTS

| 8,132,729 | B2 | 3/2012 | Silverbrook |
| 9,609,288 | B1 * | 3/2017 | Richman ............... G06Q 50/16 |
| 9,953,412 | B1 | 4/2018 | Anderson et al. |

(Continued)

FOREIGN PATENT DOCUMENTS

| WO | WO-2011017241 A1 * | 2/2011 | ............ G06T 7/001 |
| WO | WO-2018098066 A2 * | 5/2018 | ....... G06Q 10/06395 |

OTHER PUBLICATIONS

Galantucci, Rosella, et al., "Advanced damage detection techniques in historical buildings using digital photogrammetry and 3D surface analysis" [abstract], J. Cultural Heritage, v. 36, pp. 51-62 (2018).

(Continued)

*Primary Examiner* — Rebecca A Volentine
(74) *Attorney, Agent, or Firm* — Jack V. Musgrove; Haley J. McClory

(57) ABSTRACT

In order to detect possible damage to a delivered product, a set of first images of the product is created prior to delivery which are used to generate a first 3D photogrammetry model, and a set of second electronic images are created after delivery which are used to generate a second 3D photogrammetry model. The two models are then compared to determine whether there is a sufficient deviation to conclude the product has been damaged. The comparison is performed by a cognitive system trained with samples of before/after photogrammetry model pairs each associated with either a damaged condition or a not damaged condition. The baseline photogrammetry model is part of a blockchain record and the recipient photogrammetry model is added to the blockchain record. Intermediate photogrammetry models can also be built where there is more than one shipper along the delivery route to assign liability to the proper party.

20 Claims, 7 Drawing Sheets

(56) References Cited

U.S. PATENT DOCUMENTS

| | | |
|---|---|---|
| 10,593,109 B1* | 3/2020 | Floyd .................. G05D 1/0094 |
| 2009/0083078 A1 | 3/2009 | Landstrom et al. |
| 2010/0042459 A1 | 2/2010 | Horton |
| 2016/0171439 A1* | 6/2016 | Ladden ................ G06T 7/0004 705/340 |
| 2017/0091706 A1 | 3/2017 | Lloyd et al. |
| 2019/0102874 A1* | 4/2019 | Goja ........................ G06T 7/74 |

OTHER PUBLICATIONS

Xu, Yongfeng, "Photogrammetry-based structural damage detection by tracking a visible laser line" [abstract], Structural Health Monitoring, v. 19, n. 1, pp. 322-336 (2019).

* cited by examiner

DELIVERY PACKAGE DAMAGE DETECTION USING PHOTOGRAMMETRY MODELS

BACKGROUND OF THE INVENTION

Field of the Invention

The present invention generally relates to order fulfillment, and more particularly to a method of detecting damage to a product that occurred during a delivery or other handling of the product.

Description of the Related Art

As more and more shoppers are making purchases online via the Internet, there has been a dramatic increase in shipping and delivery requirements. Many companies that previously only had brick-and-mortar stores (i.e., physical storefronts with no Internet presence) have added online shopping capabilities, and there is in particular an increased demand for shipping such goods in an expedited manner.

A number of tracking systems have been devised to facilitate the proper delivery of a shipped product. The simplest of these is applying a printed label to a product or packaging having a tracking number unique to the shipment. The tracking number can be printed in human-readable form, machine-readable form, or both. Examples of machine-readable formats including various types of optical bar codes or other optical codes such as a quick response (QR) code consisting of black squares arranged in a square grid on a white background. Other optical encoding techniques include QR code variants such as IQR code, and color encoding such as JAB. The printed label can have other information like the shipper/origin, the recipient name and location, or other shipping-related data.

Some shippers alternatively or additionally apply an electronic tag to a product bearing another unique tracking number. The electronic tag could be a magnetic strip having adhesive on one side which adheres to the product, or could be a radio-frequency identification (RFID) marker attached to the product using a removable fastener. An RFID marker could be passive (temporarily absorbing electrical energy from a nearby electronic reader's radio waves) or active (having a local power source such as a battery). In this manner, anyone involved in the shipping/delivery process can use an electronic reader to scan the tag and retrieve the tracking number without having to open the product packaging.

Such tracking systems allow parties involved in the shipping process to create a log showing movement of the product from store to intermediate shipping locations to final customer destination. This tracking of a package is extremely helpful in finding lost or misplaced goods as well as letting a customer see the progress of a delivery and understand better when it is likely to arrive. As package tracking technologies have evolved, it has also become possible to increase the amount of information and metrics returned about a package beside its location such as temperature, humidity, pressure, acceleration, elevation and exposure to light at different time points, factors that may be critical for fragile or perishable contents.

A more recent approach for monitoring the shipping and delivery of products employs blockchain technology. Blockchain uses a series of records, called blocks, that are linked using cryptography. Each block contains a cryptographic hash of the previous block, a timestamp, and transaction data. This type of recordkeeping allows continuity in recording related transactions while maintaining the integrity of the records. This approach thus allows products to be tracked end-to-end, from manufacturer to customer.

SUMMARY OF THE INVENTION

The present invention in at least one embodiment is generally directed to a method of assessing the condition of a delivered product by receiving one or more baseline electronic images of the product created prior to delivery of the product from a sender to a recipient, generating a baseline photogrammetry model of the product based on the one or more baseline electronic images, receiving one or more recipient electronic images of the product created after delivery of the product to the recipient, generating a recipient photogrammetry model of the product based on the one or more recipient electronic images, and comparing the baseline photogrammetry model to the recipient photogrammetry model to determine whether the product has been damaged. The comparison can be performed by a cognitive system trained with a plurality of input samples of baseline/recipient photogrammetry model pairs, each baseline/recipient model pair being selectively associated with either a damaged condition or a not damaged condition. In the preferred implementation the baseline photogrammetry model is part of a blockchain record and the recipient photogrammetry model is added to the blockchain record. The comparison of photogrammetry models might indicate that the product has not been damaged, in which case delivery of the product to the recipient can be validated. The comparison of photogrammetry models might alternatively indicate that the product has been damaged, in which case an alert is transmitted to the sender. The product might be delivered from the sender to the recipient along a delivery chain that includes at least first and second legs, the product being handled by a first shipper for the first leg and being handled by a second shipper for the second leg, in which case the method will also receive one or more intermediate electronic images of the product created after the product has completed the first leg and before the product has begun the second leg, generate an intermediate photogrammetry model of the product based on the one or more intermediate electronic images, and compare the baseline photogrammetry model to the intermediate photogrammetry model to determine which of the first and second shippers is responsible for damage to the product. Preferably, a plurality of the baseline electronic images show the product from different sides, a plurality of the recipient electronic images show the product from different sides, and the baseline photogrammetry model and the recipient photogrammetry model are both three-dimensional models.

The above as well as additional objectives, features, and advantages in the various embodiments of the present invention will become apparent in the following detailed written description.

BRIEF DESCRIPTION OF THE DRAWINGS

The present invention may be better understood, and its numerous objects, features, and advantages of its various embodiments made apparent to those skilled in the art by referencing the accompanying drawings.

The use of the same reference symbols in different drawings indicates similar or identical items.

DESCRIPTION OF THE PREFERRED EMBODIMENT(S)

As the demands of online sales rise, there has also been an increase in problems with customers receiving their goods undamaged. When fulfilling and delivering products, the products often pass between many different parties before arriving at the doorstep of the customer. When a customer receives a damaged package, liability is typically difficult to determine; a shipper may contend that the product was originally received in a damaged state, or was damaged subsequent to delivery. Tracking systems can help find lost deliveries and provide a good estimate for time of delivery, but do nothing to avoid damage or determine liability. The results are a retailer or delivery provider losing revenue, and a poor customer experience. To prevent this type of loss, it is not just necessary to track the location of the package, but also to monitor the package's health throughout each stage of the journey.

It would, therefore, be desirable to devise an improved method of tracking product deliveries that could accurately assess any possible damage to a package or product. It would be further advantageous if the method could be carried out in a manner that prevents tampering of the assessment records. These and other advantages are achieved in various implementations of the present invention by building photogrammetry models for the product or package based on photographs taken at different stages in the delivery, and comparing the photogrammetry models to ascertain that damage has occurred. The model records can then be examined further to determine which party was handling the product when damage occurred. As an order is picked from a store or warehouse, the staff will photograph each item with a handheld device. Appropriate software will save and process the photos to build the model and upload that information to a shared ledger to verify its health at the first stage of the process. This process continues with each handoff of the product from entity to entity all the way until it arrives at the consumer. This builds a log that can either be processed in real-time to determine damage, or used as historical evidence of damage or changes to the product at any step of the way. In the exemplary embodiment a cognitive system (machine learning) is used to detect damage based on the different photogrammetry models. The delivery logs can advantageously be implemented as a blockchain ledger which includes the models to provide a tamper-proof record.

Figure 1:
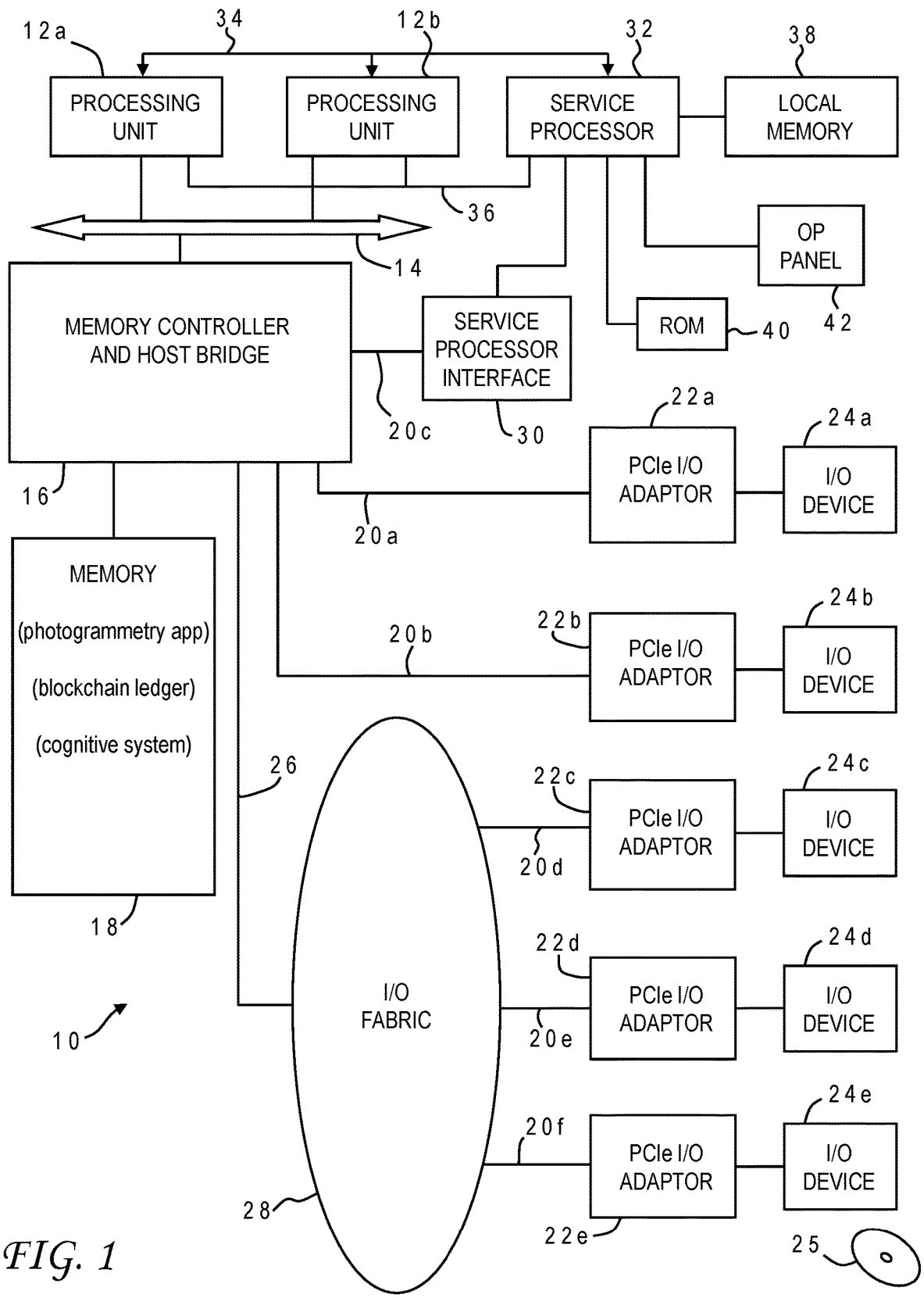
FIG. 1 is a block diagram of a computer system programmed to carry out delivery damage detection in accordance with one implementation of the present invention.

With reference now to the figures, and in particular with reference to FIG. 1, there is depicted one embodiment 10 of a computer system in which the present invention may be implemented to carry out detection of damage to delivered goods. Computer system 10 is a symmetric multiprocessor (SMP) system having a plurality of processors 12a, 12b connected to a system bus 14. System bus 14 is further connected to and communicates with a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches. System memory 18 has one or more programs loaded therein in accordance with the present invention, including a photogrammetry application, a blockchain ledger, and/or a cognitive system.

MC/HB 16 also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive which receives an optical disk 25 (one example of a computer readable storage medium) such as a CD or DVD, and a network card. Each PCIe adaptor provides an interface between the PCI link and the respective I/O device. MC/HB 16 provides a low latency path through which processors 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20c connects MC/HB 16 to a service processor interface 30 to allow communications between I/O device 24a and a service processor 32. Service processor 32 is connected to processors 12a, 12b via a JTAG interface 34, and uses an attention line 36 which interrupts the operation of processors 12a, 12b. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention. The invention may further be implemented in an equivalent cloud computing network.

When computer system 10 is initially powered up, service processor 32 uses JTAG interface 34 to interrogate the system (host) processors 12a, 12b and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12a, 12b for execution of the program code, e.g., an operating system (OS) which is used to launch applications and in particular the damage detection application of the present invention, results of which may be stored in a hard disk drive of the system (an I/O device 24). While host processors 12a, 12b are executing program code, service processor 32 may enter a mode of monitoring and reporting any operating parameters or errors, such as the cooling fan speed and operation, thermal sensors, power supply regulators, and recoverable and non-recoverable errors reported by any of processors 12a, 12b, memory 18, and MC/HB 16. Service processor 32 may take further action based on the type of errors or defined thresholds.

The present invention may be a system, a method, and/or a computer program product. The computer program product may include one or more computer readable storage media collectively having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In the illustrative implementations computer system 10 carries out program instructions for a delivery damage detection process that employs novel photogrammetry processing techniques to create a blockchain ledger that can be used to detect potential damage to delivered products and identify the responsible party(ies). Accordingly, a program embodying the invention may additionally include conventional aspects of various photogrammetry and blockchain tools, and these details will become apparent to those skilled in the art upon reference to this disclosure.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include various characteristics, service models, and deployment models.

Characteristics can include, without limitation, on-demand service, broad network access, resource pooling, rapid elasticity, and measured service. On-demand self-service refers to the ability of a cloud consumer to unilaterally provision computing capabilities, such as server time and network storage, as needed automatically without requiring human interaction with the service's provider. Broad network access refers to capabilities available over a network and accessed through standard mechanisms that promote use by heterogeneous thin or thick client platforms (e.g., mobile phones, laptops, and personal digital assistants, etc.). Resource pooling occurs when the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity means that capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service is the ability of a cloud system to automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models can include, without limitation, software as a service, platform as a service, and infrastructure as a service. Software as a service (SaaS) refers to the capability provided to the consumer to use the provider's applications running on a cloud infrastructure. The applications are accessible from various client devices through a thin client interface such as a web browser. The consumer does not manage or control the underlying cloud infrastructure including network, servers, operating systems, storage, or even individual application capabilities, with the possible exception of limited user-specific application configuration settings. Platform as a service (PaaS) refers to the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a service (IaaS) refers to the capability provided to the consumer to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models can include, without limitation, private cloud, community cloud, public cloud, and hybrid cloud. Private cloud refers to the cloud infrastructure being operated solely for an organization. It may be managed by the organization or a third party and may exist on-premises or off-premises. A community cloud has a cloud infrastructure that is shared by several organizations and supports a specific community that has shared concerns (e.g., mission, security requirements, policy, and compliance considerations). It may be managed by the organizations or a third party and may exist on-premises or off-premises. In a public cloud, the cloud infrastructure is made available to the general public or a large industry group and is owned by an organization selling cloud services. The cloud infrastructure for a hybrid cloud is a composition of two or more clouds (private, community, or public) that remain unique entities but are bound together by standardized or proprietary technology that enables data and application portability (e.g., cloud bursting for load-balancing between clouds).

Figure 2:
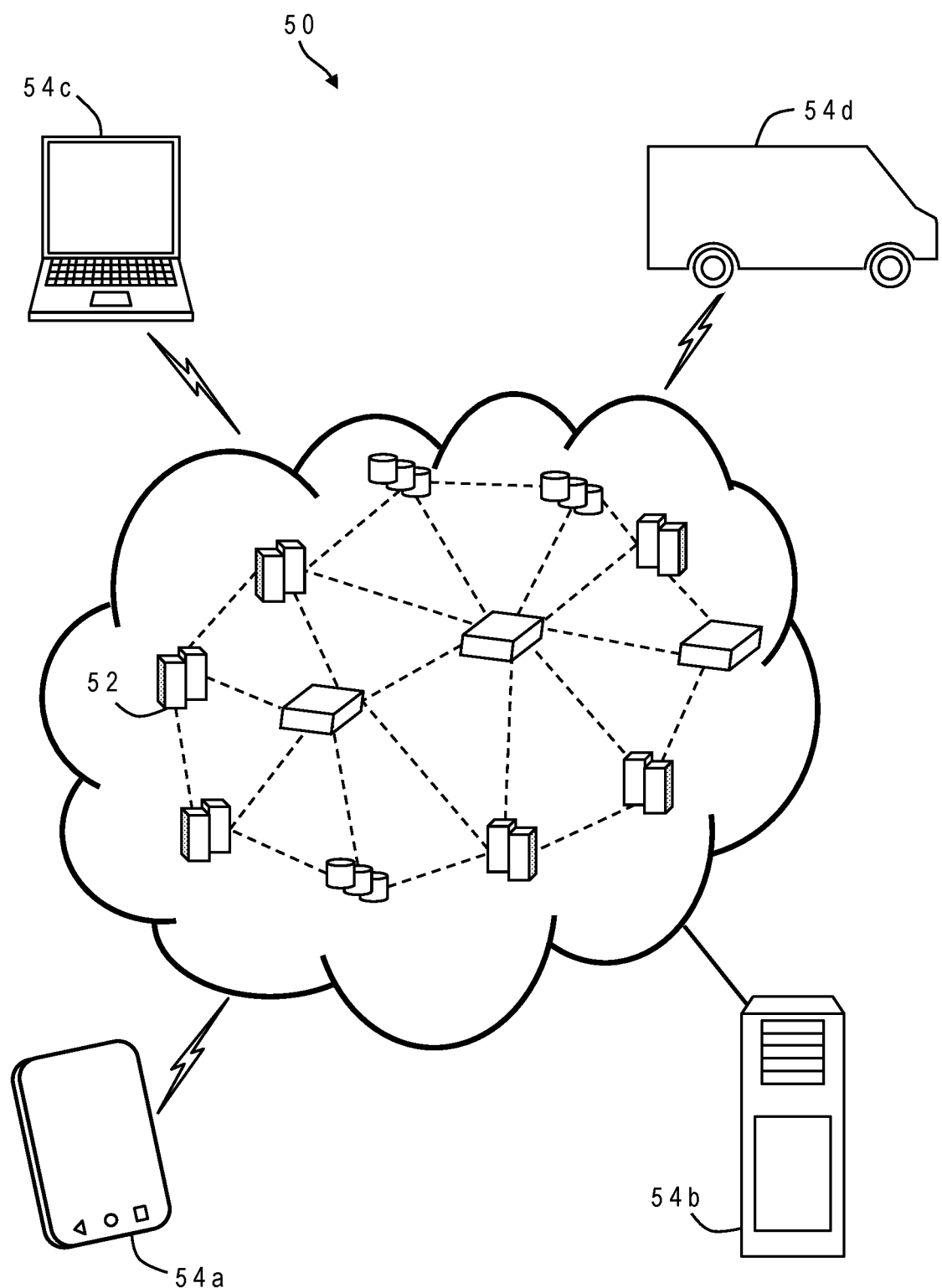
FIG. 2 is a pictorial representation of a cloud computing environment in accordance with one implementation of the present invention.

A cloud computing environment is service oriented with a focus on statelessness, low coupling, modularity, and semantic interoperability. At the heart of cloud computing is an infrastructure that includes a network of interconnected nodes. An illustrative cloud computing environment 50 is depicted in FIG. 2. As shown, cloud computing environment 50 includes one or more cloud computing nodes 52 with which local computing devices used by cloud consumers, such as, for example, personal digital assistant (PDA) or cellular telephone 54*a*, desktop computer 54*b*, laptop computer 54*c*, and/or vehicle computer system 54*d* may communicate. Nodes 52 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54*a*-54*d* shown in FIG. 2 are intended to be illustrative only and that computing nodes 52 and cloud computing environment 50 can communicate with any type of computerized device over any type of network and/or network addressable connection (e.g., using a web browser).

Figure 3:
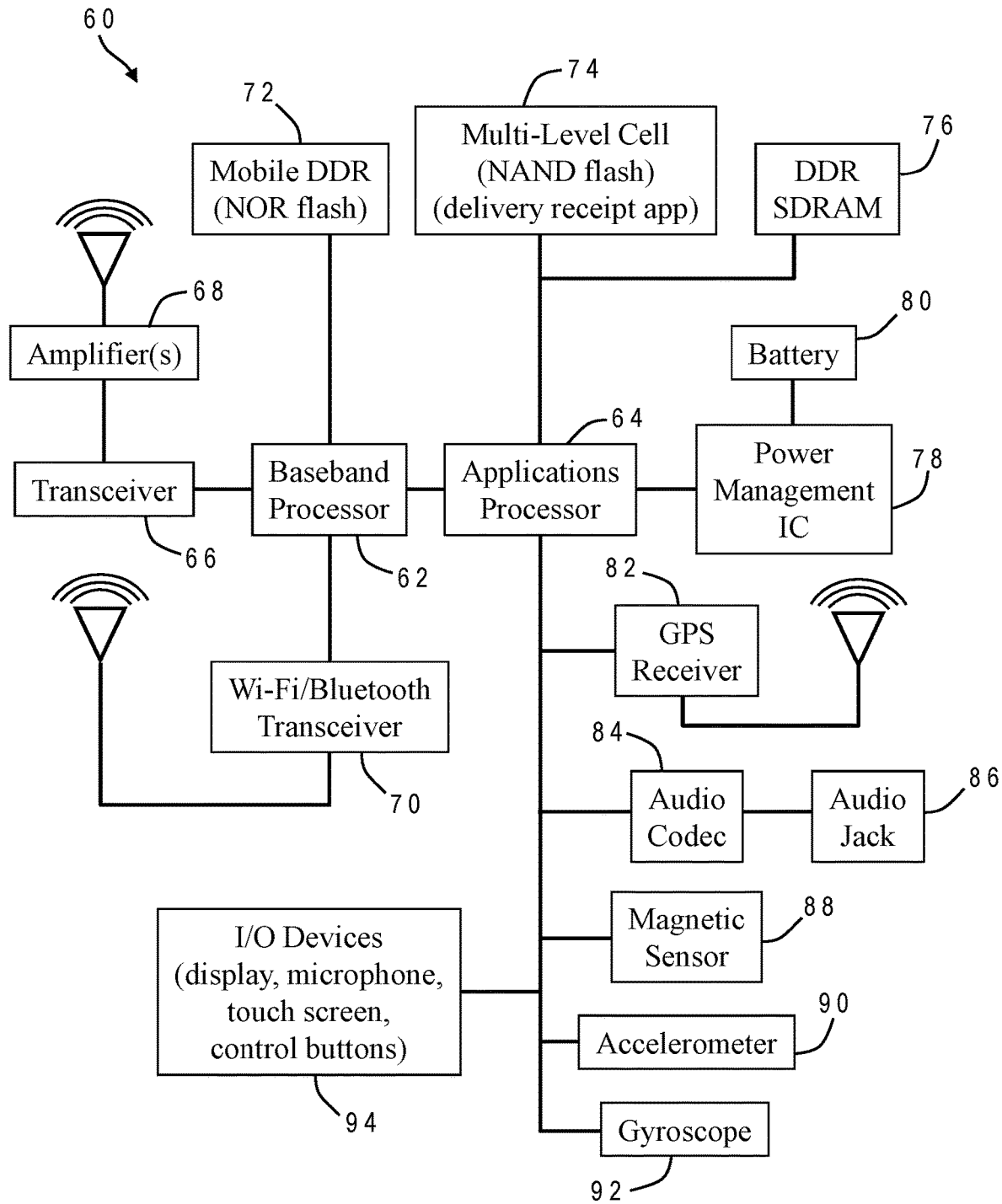
FIG. 3 is a block diagram of a mobile computing device (e.g., smartphone) having an app designed to upload photos of a shipped product to a cloud server to enable damage detection in accordance with one implementation of the present invention.

Referring now to FIG. 3, there is depicted one example 60 of a mobile computing device or smartphone in which embodiments of the present invention may be implemented to verify proper product delivery by the user. As with computer system 10, alternative embodiments of smartphone 60 may include modifications of the hardware components or their interconnections, or additional components, and other mobile computing devices may be used besides smartphones such as tablets or notebooks, so the depicted example should not be construed as implying any architectural limitations with respect to the present invention. In this example smartphone 60 includes a baseband processor 62 and an applications processor 64. Baseband processor 62 manages most of the radio (wireless communications) functions of smartphone 60, including communication with a wireless service provider (including Internet transmissions) via a transceiver 66 which is connected by one or more power amplifiers 68 to a network antenna. Baseband processor can also control Wi-Fi and Bluetooth transmissions through transceiver 70 connected to a local antenna. Baseband processor 62 uses a dedicated mobile DDR memory (NOR flash) 72.

Baseband processor 62 essentially acts as an input/output (I/O) device with respect to applications processor 64 which executes the software programs (apps) embodying the invention. Those applications may include one or more programs that can also be carried out by computer system 10. Applications processor 64 preferably utilizes multi-level cell memory (NAND flash) 74 and DDR synchronous dynamic random-access memory (SDRAM) 76. In particular, NAND flash 74 may store a delivery receipt application of the present invention to allow a user to upload photographs and receive confirmation that no damage has occurred or alternatively receive an alert of damage. Applications processor 64 can interact with a power management integrated circuit 78 to control the power supply (battery) 80. Applications processor 64 can additionally receive inputs from a variety of peripheral devices such as a global positioning satellite (GPS) receiver 82 connected to a GPS antenna, an audio codec 84 which drives an audio (e.g., headphone) jack 86, a magnetic sensor 88 for azimuthal indication, an accelerometer 90 for crash detection and prevention, a 3-axis gyroscope 92 for orientation indication, and user I/O devices 94 (e.g., touch screen/display, microphone and control buttons). Smartphone 60 may include many other hardware features not illustrated, for example, a camera and associated driver circuitry.

When smartphone 60 is first turned on, baseband processor 62 and applications processor 64 may perform various tests such as built-in-self-tests or memory tests on the memory components 72, 74, 76. If the systems pass the tests then each processor begins execution of its primary code, namely, a communications link for baseband processor 62 and an operating system for applications processor 64. Once the network communications have been established by baseband processor 62 and the operating system is loaded by applications processor 64, the user can enter appropriate commands via the touch screen or microphone to load executable code representing embodiments of the present invention for execution by applications processor 64. Any or all of the functionalities of computer system 10 can be incorporated directly into mobile device 60 as computing power and memory storage permit.

Figure 4:
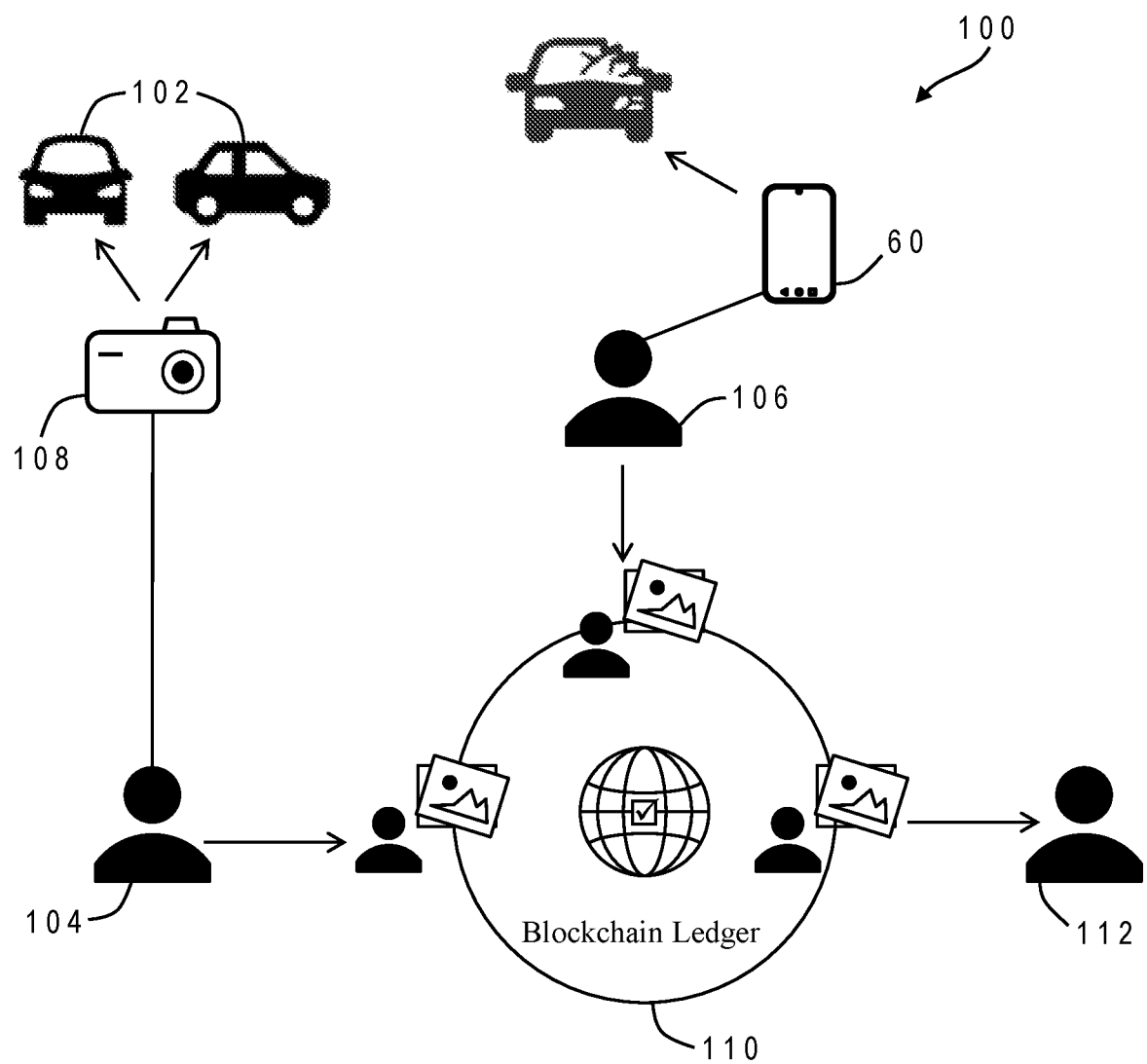
FIG. 4 is a pictorial representation of a delivery damage detection environment in accordance with one implementation of the present invention.

FIG. 4 illustrates one example of a delivery damage detection environment 100 for carrying out the present invention in accordance with one implementation. An item or product 102 is selected by the staff 104 of the retail establishment according to instructions of a customer 106. Customer 106 may be remote from the store or warehouse where the product is physically kept, e.g., making an online purchase through an online presence of the store via the Internet. Product 102 is photographed by staff 104 with a handheld device such as a digital camera 108. Other devices could be used including mobile phones, a store tablet, or a custom device that provides an interface with a cloud service 110 that performs one or more functions in accordance with the present invention, including maintaining a blockchain ledger having transactions associated with this purchase of the product. While the present invention may be carried out using only one photograph, it preferably relies on several photographs of the same product taken from different angles, i.e., from more than one side of the product. The photos may be of the product itself or of the packaging for the product, including packaging that is provided from the manufacturer or seller as well as outer packaging provided by the shipping service. For example, the photographs could just be of the cardboard box containing the product. In some implementations, more than one set of photographs can be provided, such as one set of photographs of the bare product itself, prior to packaging, and another set of photographs of the packaged product.

Cloud service 110 processes the photographs using photogrammetry, and builds a three-dimensional (3D) model of the item (or packaging). Photogrammetry is generally known in the art and pertains to the measurement and interpretation of photographic images. In particular the present invention can use conventional stereophotogrammetry techniques to build the 3D model of the item from multiple high-resolution images. In some implementations cloud service 110 can prompt the staff (or other person taking the pictures) to request additional pictures until the photogrammetry software has obtained a critical "completeness" of the model. This process then outputs a set of points, in 3D space, digitally representing the package's exterior surface. In instances where only one photograph (or a limited number) is available, more complicated algorithms can be used to extrapolate the 3D model. The function of building the photogrammetry model could alternatively be carried out by a local computing device used by the staff (such as computer system 10), and then uploaded to cloud service 110.

Cloud service 110 takes the photogrammetry model and adds it to the blockchain ledger which is also preferably stored in the cloud. If this specific product is already the subject of an existing blockchain ledger then cloud service 110 updates that ledger, otherwise it creates a new ledger. The addition of photogrammetry models to the blockchain ledger can be repeated as many times as the product/package is passed off from one intermediate entity to another in the course of the delivery. While the use of blockchain technology for carrying out the present invention is preferable, it is not necessary. Other (less secure) approaches can be used such as cloud time-stamping or a database in lieu of the blockchain ledger. For specific use cases of particularly valuable items, blockchain technology is highly recommended for storing the data.

Once product 102 is delivered to the final destination, customer 106 can take another set of pictures, e.g., using their smartphone 60. These pictures are again uploaded to cloud service 110 which creates another photogrammetry model for the product as delivered. This latest model is then compared to previous models of the same product (in the blockchain ledger) to assess its condition. Each of the models is normalized for the damage assessment, i.e., the same physical scale is used in the model comparison even if the scales in the photograph sets are different. Algorithms can be devised for rules-based detection of damage based on threshold deviations in the sets of points representing the models, but in the exemplary implementation a cognitive system is used to decide whether the latest model indicates a damaged product, as explained further below in conjunction with FIG. 5. Damage may be indicated by a misshapen feature as well as discoloration of a feature.

The earliest model constructed from photographs taken at the beginning of the delivery chain (i.e., at the store or manufacturer) provides a baseline for the comparison. If damage is detected compared to the baseline, additional analysis can be performed on intermediary models to pinpoint the time at which the damage first appeared, thereby identifying the party responsible for the damage. Cloud service 110 can send an alert or other notification to a supervisor 112 who can review the record to confirm liability and take further remedial action as necessary. If the comparison indicates good condition, i.e., that no damage has occurred, the system can update the blockchain ledge to confirm its health and mark proper receipt of the delivery.

Of course, the damage detection offered by the present invention can take place prior to final delivery of the product to the customer, i.e., at the intermediate parties along the delivery chain. When a third-party intermediary receives the packaged product they can take current photographs and ask cloud service 110 to confirm right then that there is no damage to the product yet. If the cloud service detects damage at that point, the delivery request can be rejected and the previous handler can be notified of the problem.

The present invention in its various implementations can thereby be manifested as part of a solution sold to retailers where a custom software application guides associates in taking appropriate photos of items. The goal is to have a collection of photos that not only cover most if not all of the items (e.g. front/back/sides), but also make it easier for photogrammetry techniques to pick up on any defects.

The present invention in operation for at least some implementations may be better understood with reference to an example wherein a customer, John, has ordered a new car online, to be delivered at his home. The car dealership enlists the aid of a trucking transportation service Sharp Eye Shipping which offers to employ a system constructed in accordance with the present invention to monitor any changes to the vehicle's condition throughout the different legs of the trip, in each of which the new car is transported by different independent truckers. Each trucker takes pictures of the new car as it is handed off, i.e., at the beginning of the next leg of the journey. When the new car arrives at John's house, he notices a dent on the lower right-hand side of the front bumper. John calls Sharp Eye Shipping who uses the blockchain record for the shipment to detect that a dent did appear on the car after the final leg of the trip, that was not present at the beginning of that leg. Sharp Eye Shipping accordingly invoices the moving company used for the final leg for the damages, and disburses the corresponding funds to John's account.

Figure 5:
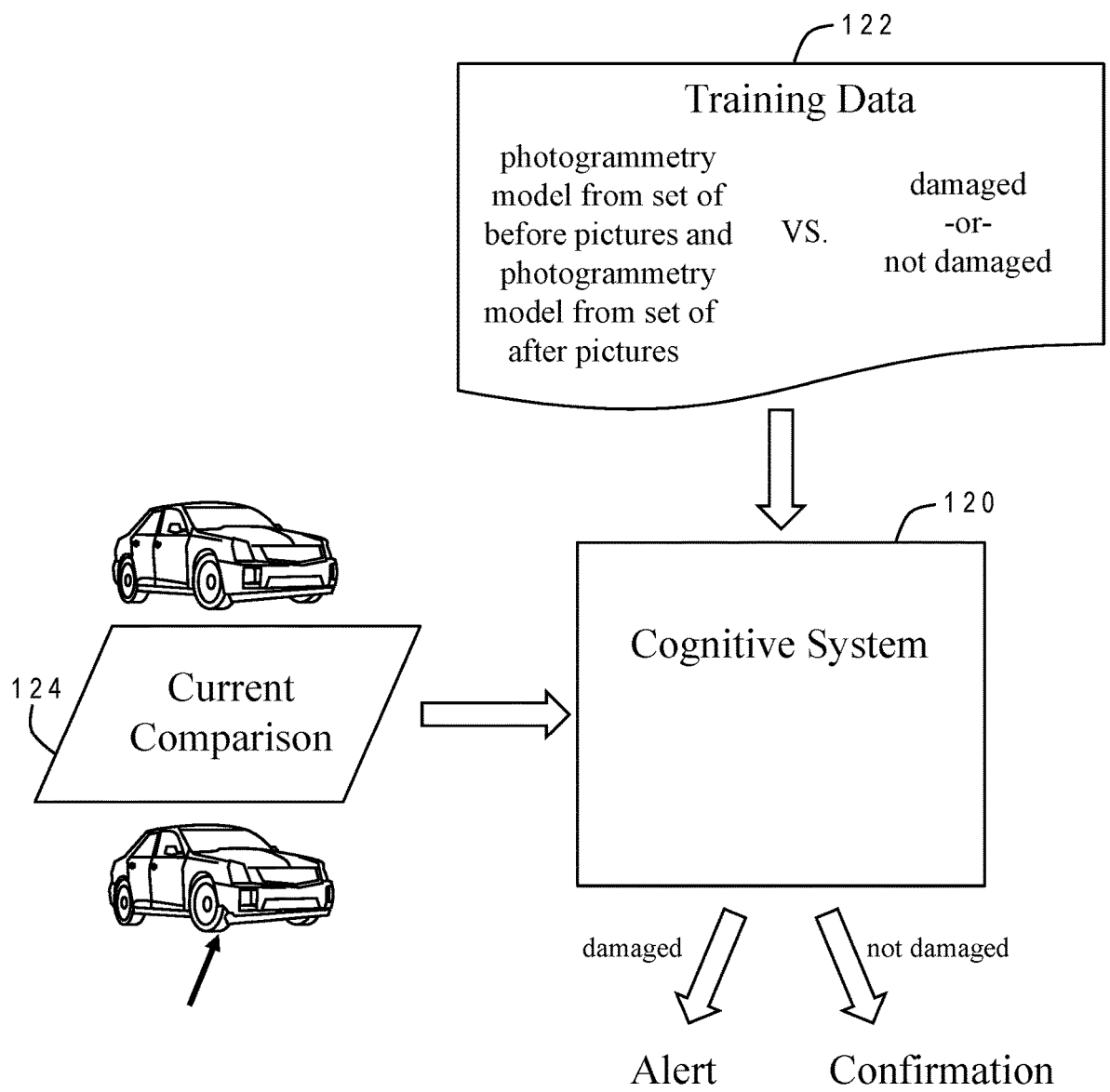
FIG. 5 is a block diagram of a cognitive system used to detect damage from photogrammetry models in accordance with one implementation of the present invention.

FIG. 5 illustrates one embodiment of a cognitive system 120 that can be used to detect damage based on a comparison of before-and-after photogrammetry models. Cognitive systems are generally known in the art. A cognitive system (sometimes referred to as deep learning, deep thought, or deep question answering) is a form of artificial intelligence that uses machine learning and problem solving. Cognitive systems often employ neural networks although alternative designs exist. The neural network may be of various types. A feedforward neural network is an artificial neural network wherein connections between the units do not form a cycle. The feedforward neural network was the first and simplest type of artificial neural network devised. In this network, the information moves in only one direction, forward, from the input nodes, through the hidden nodes (if any) and to the output nodes. There are no cycles or loops in the network. As such, it is different from recurrent neural networks. A recurrent neural network is a class of artificial neural network where connections between units form a directed cycle. This creates an internal state of the network which allows it to exhibit dynamic temporal behavior. Unlike feedforward neural networks, recurrent neural networks can use their internal memory to process arbitrary sequences of inputs. A convolution neural network is a specific type of feed-forward neural network based on animal visual perception, and so is particularly useful in processing image data, such as the photogrammetry models of the present invention. Convolutional neural networks are similar to ordinary neural networks but are made up of neurons that have learnable weights and biases.

There are many alternatives to the use of neural networks for machine learning, such as a support vector machine (SVM). An SVM basically constructs a multidimensional mathematical space based on training examples, and provides a boundary in that space that allows for binary classification of an input, e.g., as a "good" answer versus a "bad" answer. Another approach involves Bayesian networks which represent a set of variables with a directed acyclic graph. The network is then used to compute probabilistic relationships between the variables. A cognitive system is not limited to use of a single approach, i.e., it can incorporate any number of these machine learning algorithms.

For purposes of the present invention, cognitive system 120 is trained using training data 122 containing of a very large number of input samples each having a corresponding output value. Each input sample consists of a "before" 3D photogrammetry model of an object and an "after" 3D photogrammetry model of the same object. Alternatively, the input samples can represent computed deltas between before and after models for a given object. The output values are either "damaged" or "not damaged" depending upon whether the deviations between a before model and an after model are deemed sufficiently significant by the training designer. Different samples are directed to different objects. In a generalized application the training data also includes different types of objects, but cognitive system 120 could be tailored to a specific application with samples more narrowly pertaining to objects that are relevant to the specific application. For example, cognitive system 120 could be designed for detecting flaws in motorized vehicles in which case the training data could be photogrammetry models for various cars, trucks and motorcycles.

In this manner, cognitive system becomes trained to recognize whether a new pair of before/after photogrammetry models represent actionable damage, i.e., binary classification as either "damaged" or "not damaged". Cloud service 110 can then provide before and after models 124 for a current transaction to cognitive system 120, i.e., a before model generated from the original (baseline) photograph set of a product and an after model generated from the final (customer) photograph set of the product. Cognitive system uses the current comparison 124 to output the damaged/not damaged indication. An indication of damage leads to generation of an appropriate alert, while an indication of no damage leads to a confirmation (acceptance) of the transaction.

Figure 6A:
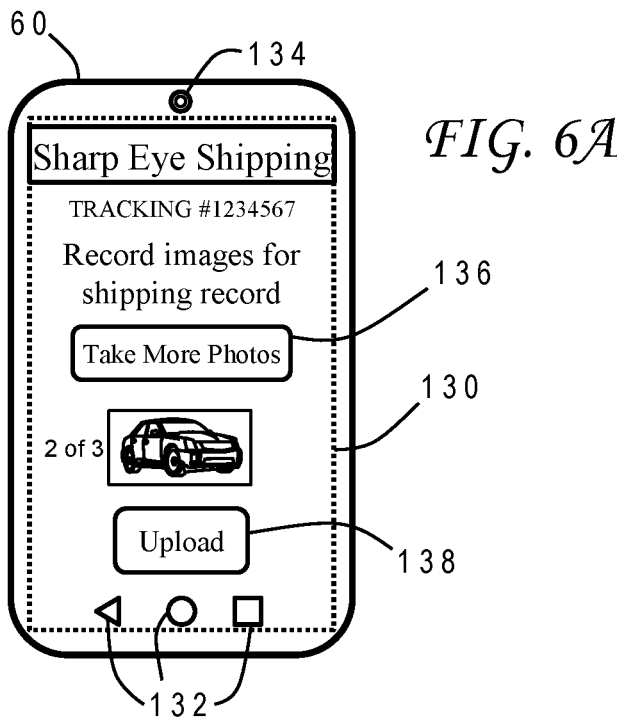
FIGS. 6A, 6B, and 6C are elevational views of a screen of a smartphone showing how the app can be deployed to upload images to a damage detection service and allowing reporting of damage in accordance with one implementation of the present invention.
Figure 6B:
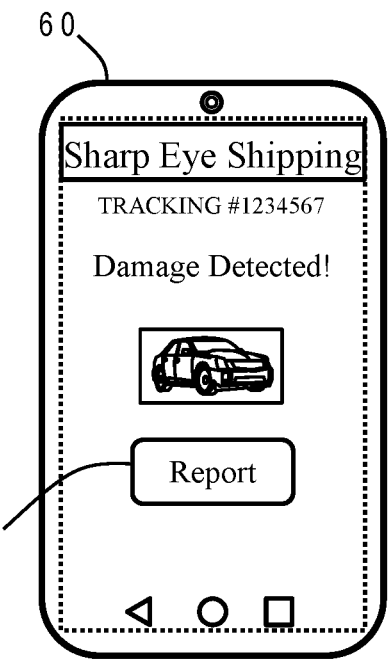
Figure 6C:
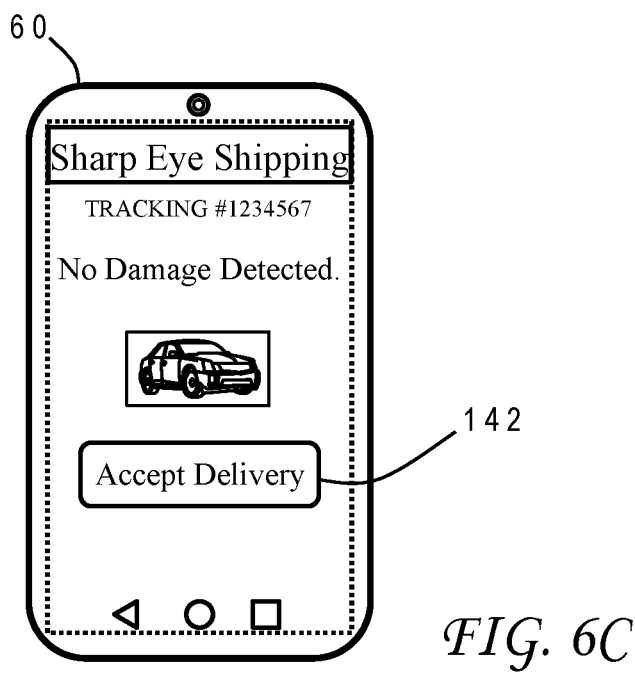

Further to the foregoing examples, FIGS. 6A-6C show how a display screen 130 of smartphone 60 might present certain information in accordance with one implementation of the present invention where smartphone 60 is used by a recipient of the delivery (the customer). In this embodiment display screen 130 is a touch screen. Display screen 130 may include various conventional features in addition to the novel features pertinent to the present invention. The conventional features may for example include one or more icons 132 at the bottom of display screen 130 with programmed functionalities Smartphone 60 also has a camera 134.

The customer can use the conventional camera functionality of smartphone 60 to take several pictures of the product as delivered. The delivery receipt app running on smartphone 60 can provide an interface for selecting these pictures for uploading to the cloud service. The app may provide a prompt 136 to the customer to take more pictures in response to feedback from the cloud service indicating that more image data is desired to build the current photogrammetry model. Once the pictures are taken, the customer can hit an "Upload" button 138 to upload the pictures to the cloud service and initiate the damage detection protocol. As seen in FIG. 6B, if damage is detected, the cloud service can so inform the local app which passes along an alert to the customer. The app can also provide a "Report" button 140 to allow the customer to invoke a procedure for rejecting the product. Invoking this procedure leads the cloud service to perform the damage response functions described above. Alternatively, as seen in FIG. 6C, if damage is not detected, the cloud service again informs the local app which displays an appropriate message for the user, and provides an "Accept Delivery" button 142 to allow the customer to officially accept the product as undamaged. If the user hits button 142, the system will update the blockchain ledger to reflect the completed transaction.

Figure 7:
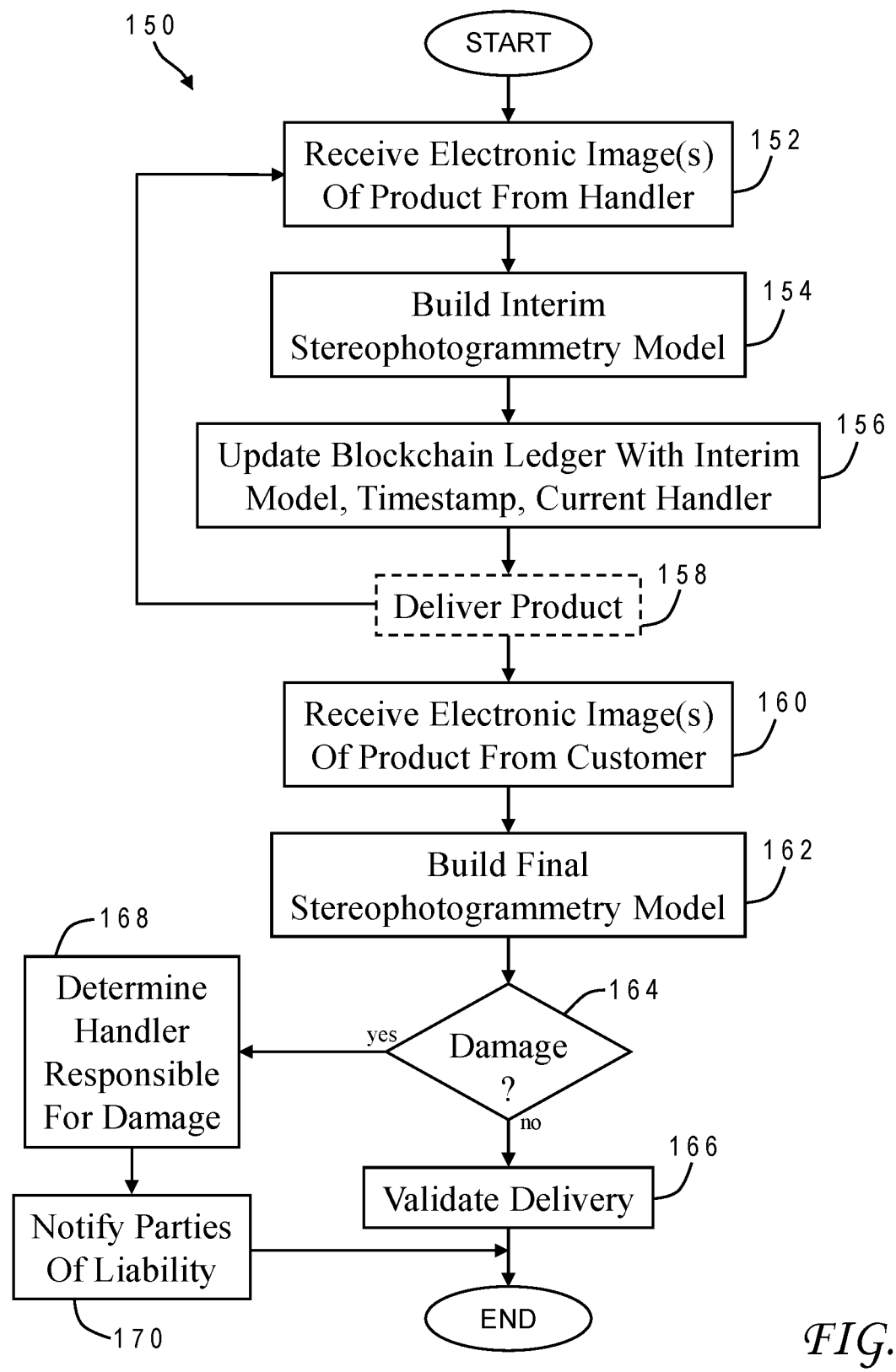
FIG. 7 is a chart illustrating the logical flow for a delivery damage detection process in accordance with one implementation of the present invention.

Different aspects of effectuating the present invention can be practiced by different entities such as the manufacturer of the product, the seller, one or more delivery services, the customer, or the cloud service, so the description herein of steps carried out from one particular perspective should not be construed in a limiting sense. The present invention can be further understood with reference to the chart of FIG. 7 which illustrates the logical flow for a delivery damage detection process 150 in accordance with one implementation which is to be carried out by a cloud service. Process 150 begins by receiving the electronic images of the product to be shipped 152. These images are initially provided by the original sender of the product, e.g., the manufacturer or online store. The cloud service uses the images to build an interim stereophotogrammetry model 154. The blockchain ledger for the product is updated 156 with this interim model, a timestamp, the name of or other identifier for the current handler (i.e., the entity taking the pictures), and any other transactional information pertaining to the purchase and delivery of the product. The system then waits for delivery of the product to the next recipient in the delivery chain 158. "Delivery" in this sense can refer to passing off the product from any one location/party to any other location/party (e.g., store or warehouse to shipping service, shipping service to another shipping service, or to end customer); in some contexts delivery may be more of a form of handling at one location rather than movement between locations. If the next recipient is not the final customer, i.e., there are multiple parties involved in the shipping service, process 150 repeats iteratively at box 152 for each handler.

When the product is finally delivered to the customer, the system receives more electronic images from the customer for the product as received 160. The system uses the customer images to build the final stereophotogrammetry model 162. The final model is compared to the baseline model to determine whether any damage has occurred 164. If no damage is detected, the system validates the delivery 166. This validation can include various notifications to interested parties as well as updating and closing out the blockchain ledger. If damage is detected, further analysis is performed as necessary to pinpoint the time in the chain of custody of the product where the damage occurred, and assign liability to the responsible party as indicated in the blockchain ledger 168. The system can then send appropriate notifications to the parties regarding liability and the measures to be taken for remediation 170.

The present invention thereby offers a superior method for detecting damage to a delivered product in an effective manner and also for identifying responsible parties. The invention is not only useful in dealing with the repercussions of such damage, but also provides a strong incentive to shipping companies to take more precautions to prevent damage in the first place. Use of a blockchain platform further enhances the reliability of the system. The invention can advantageously leverage existing technologies such as smartphones and cloud computing to provide a robust approach to delivery damage detection.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, the present invention has been described with regard to delivery of a retail product purchased by a consumer, but it is equally applicable to other purchases such as wholesale which still require some sort of handling or delivery. It is therefore contemplated that such modifications can be made without departing from the spirit or scope of the present invention as defined in the appended claims.

What is claimed is:

1. A method of assessing the condition of a delivered product comprising:

receiving one or more baseline electronic images of the product created prior to delivery of the product from a sender to a recipient;

generating a baseline photogrammetry model of the product based on the one or more baseline electronic images;

receiving one or more recipient electronic images of the product created after delivery of the product to the recipient;

generating a recipient photogrammetry model of the product based on the one or more recipient electronic images;

determining the product has been delivered to an intermediary party;

validating, to the intermediary party, whether the product has been damaged, wherein validating whether the product has been damaged includes comparing the baseline photogrammetry model to the recipient photogrammetry model;

identifying the product has been damaged;

determining, responsive to identifying the product has been damaged, the intermediary party has rejected delivery;

analyzing one or more intermediary models of the baseline photogrammetry model to determine a time duration associated with the damage;

detecting liability associated with the damage, based on analyzing the one or more intermediary models; and issuing one or more notifications, associated with the detected liability and one or more remedial actions, to one or more parties associated with the product.

2. The method of claim 1 wherein said comparing is performed by a cognitive system trained with a plurality of input samples of baseline/recipient photogrammetry model pairs, each baseline/recipient model pair being selectively associated with either a damaged condition or a not damaged condition.

3. The method of claim 1 wherein said comparing indicates that the product has not been damaged, and further comprising validating delivery of the product to the recipient.

4. The method of claim 1 wherein said comparing indicates that the product has been damaged, and further comprising transmitting an alert to the sender.

5. The method of claim 1 wherein the product is delivered from the sender to the recipient along a delivery chain that includes at least first and second legs, the product being handled by a first shipper for the first leg and being handled by a second shipper for the second leg, and further comprising:

receiving one or more intermediate electronic images of the product created after the product has completed the first leg and before the product has begun the second leg;

generating an intermediate photogrammetry model of the product based on the one or more intermediate electronic images; and comparing the baseline photogrammetry model to the intermediate photogrammetry model to determine which of the first and second shippers is responsible for damage to the product.

6. The method of claim 1 wherein:

a plurality of the baseline electronic images show the product from different sides;

a plurality of the recipient electronic images show the product from different sides; and the baseline photogrammetry model and the recipient photogrammetry model are both three-dimensional models.

7. The method of claim 1, further comprising:

adding the recipient photogrammetry model to a blockchain record associated with the product;

determining the liability associated with the damage is associated with the recipient based on the recipient photogrammetry model added to the blockchain record;

notifying the recipient of the liability; and closing the blockchain record associated with the product.

8. A computer system comprising:

one or more processors which process program instructions;

a memory device connected to said one or more processors; and program instructions residing in said memory device for assessing the condition of a delivered product by receiving one or more baseline electronic images of the product created prior to delivery of the product from a sender to a recipient, generating a baseline photogrammetry model of the product based on the one or more baseline electronic images, receiving one or more recipient electronic images of the product created after delivery of the product to the recipient, generating a recipient photogrammetry model of the product based on the one or more recipient electronic images, determining the product has been delivered to an intermediary party, validating to the intermediary party whether the product has been damaged, wherein validating whether the product has been damaged includes comparing the baseline photogrammetry model to the recipient photogrammetry model, identifying the product has been damaged, determining, responsive to identifying the product has been damaged, the intermediary party has rejected delivery, analyzing one or more intermediary models of the baseline photogrammetry model to determine a time duration associated with the damage, detecting liability associated with the damage, based on analyzing the one or more intermediary models, and issuing one or more notifications, associated with the detected liability and one or more remedial actions, to one or more parties associated with the product.

9. The computer system of claim 8 wherein the comparing is performed by a cognitive system trained with a plurality of input samples of baseline/recipient photogrammetry model pairs, each baseline/recipient model pair being selectively associated with either a damaged condition or a not damaged condition.

10. The computer system of claim 8 wherein the baseline photogrammetry model is part of a blockchain record, and said program instructions further add the recipient photogrammetry model to the blockchain record.

11. The computer system of claim 8 wherein the comparing indicates that the product has not been damaged, and said program instructions further validate delivery of the product to the recipient.

12. The computer system of claim 8 wherein the comparing indicates that the product has been damaged, and said program instructions further transmit an alert to the sender.

13. The computer system of claim 8 wherein the product is delivered from the sender to the recipient along a delivery chain that includes at least first and second legs, the product being handled by a first shipper for the first leg and being handled by a second shipper for the second leg, and said program instructions further receive one or more intermediate electronic images of the product created after the product has completed the first leg and before the product has begun the second leg, generate an intermediate photogrammetry model of the product based on the one or more intermediate electronic images, and compare the baseline photogrammetry model to the intermediate photogrammetry model to determine which of the first and second shippers is responsible for damage to the product.

14. The computer system of claim 8 wherein:
- a plurality of the baseline electronic images show the product from different sides;
- a plurality of the recipient electronic images show the product from different sides; and
- the baseline photogrammetry model and the recipient photogrammetry model are both three-dimensional models.

15. A computer program product comprising:
one or more computer readable storage media; and
program instructions collectively residing in said one or more computer readable storage media for assessing the condition of a delivered product by receiving one or more baseline electronic images of the product created prior to delivery of the product from a sender to a recipient, generating a baseline photogrammetry model of the product based on the one or more baseline electronic images, receiving one or more recipient electronic images of the product created after delivery of the product to the recipient, generating a recipient photogrammetry model of the product based on the one or more recipient electronic images, determining the product has been delivered to an intermediary party, validating to the intermediary party whether the product has been damaged, wherein validating whether the product has been damaged includes comparing the baseline photogrammetry model to the recipient photogrammetry model, identifying the product has been damaged, determining, responsive to identifying the product has been damaged, the intermediary party has rejected delivery, analyzing one or more intermediary models of the baseline photogrammetry model to determine a time duration associated with the damage, detecting liability associated with the damage, based on analyzing the one or more intermediary models, and issuing one or more notifications, associated with the detected liability and one or more remedial actions, to one or more parties associated with the product.

16. The computer program product of claim 15 wherein the comparing is performed by a cognitive system trained with a plurality of input samples of baseline/recipient photogrammetry model pairs, each baseline/recipient model pair being selectively associated with either a damaged condition or a not damaged condition.

17. The computer program product of claim 15 wherein the baseline photogrammetry model is part of a blockchain record, and said program instructions further add the recipient photogrammetry model to the blockchain record.

18. The computer program product of claim 15 wherein the comparing indicates that the product has not been damaged, and said program instructions further validate delivery of the product to the recipient.

19. The computer program product of claim 15 wherein the comparing indicates that the product has been damaged, and said program instructions further transmit an alert to the sender.

20. The computer program product of claim 15 wherein the product is delivered from the sender to the recipient along a delivery chain that includes at least first and second legs, the product being handled by a first shipper for the first leg and being handled by a second shipper for the second leg, and said program instructions further receive one or more intermediate electronic images of the product created after the product has completed the first leg and before the product has begun the second leg, generate an intermediate photogrammetry model of the product based on the one or more intermediate electronic images, and compare the baseline photogrammetry model to the intermediate photogrammetry model to determine which of the first and second shippers is responsible for damage to the product.

* * * * *